United States Patent [19]
Khalidi

[11] Patent Number: 5,764,897
[45] Date of Patent: Jun. 9, 1998

[54] METHOD AND APPARATUS FOR MANAGING TRANSACTIONS IN AN OBJECT-ORIENTED DISTRIBUTED SYSTEM

[75] Inventor: Yousef A. Khalidi, Sunnyvale, Calif.

[73] Assignee: Sun Microsystems, Inc., Palo Alto, Calif.

[21] Appl. No.: 738,918

[22] Filed: Oct. 28, 1996

Related U.S. Application Data

[63] Continuation of Ser. No. 23,027, Feb. 25, 1993, abandoned.

[51] Int. Cl.$^6$ .................. G06F 15/40; G06F 12/08
[52] U.S. Cl. .............. 395/200.31; 395/610; 395/702; 395/683
[58] Field of Search .................. 395/200.12, 702, 395/610, 614, 200.31, 683, 445, 200.03

[56] References Cited

U.S. PATENT DOCUMENTS

| | | | |
|---|---|---|---|
| 5,006,978 | 4/1991 | Neches | 364/200 |
| 5,095,421 | 3/1992 | Freund | 395/650 |
| 5,197,148 | 3/1993 | Blount et al. | 395/575 |
| 5,212,788 | 5/1993 | Lomet et al. | 395/600 |
| 5,247,664 | 9/1993 | Thompson et al. | 395/600 |
| 5,269,020 | 12/1993 | Kakimoto | 395/610 |
| 5,291,594 | 3/1994 | Sekiguchi et al. | 395/600 |
| 5,363,121 | 11/1994 | Freund | 395/600 |
| 5,381,545 | 1/1995 | Baker et al. | 395/575 |
| 5,426,747 | 6/1995 | Weinreb et al. | 395/400 |
| 5,530,848 | 6/1996 | Gilbert et al. | 395/610 |

OTHER PUBLICATIONS

"Recovery Management in QuickSilver" by Roger Haskin et al., IBM Almaden Research Center, ACM Transactions on Computer Systems, vol. 6, No. 1, Feb. 1988, pp. 82–108.

IBM Technical Disclosure Bulletin, "Transaction Processing System for the IBM PC", vol. 31, No. 2, Jul. 1988, New York, U.S., pp. 114–115.

OOPS Messenger, "Dealing with Atomicity in Object-Based Distributed Systems" by Rachid Guerraoui, vol. 3, No. 3, Jul. 1992, pp. 10–13.

*Primary Examiner*—Thomas C. Lee
*Assistant Examiner*—Rehana Perveen
*Attorney, Agent, or Firm*—Erwin J. Basinski

[57] ABSTRACT

This disclosure describes a solution to this basic problem of transaction management for systems which use the object metaphor to define the interfaces between different components of a system. An elegant solution is described which defines a transaction manager protocol and process, which is independent of the operating system micro-kernel's interprocess communication activities. The object-oriented transaction manager ("TM") creates transactions, keeps track of all object managers (servers) that are a part of a transaction, and coordinates transaction termination among all objects that are involved in the transaction. In addition, operations by naive applications can be made to execute under transaction control without modifying the applications.

42 Claims, 8 Drawing Sheets

(SPRING ENVIORNMENT)

ns, clients and programmers maximum flexibility without loading the operating system down with implementation details. Moreover, this problem becomes more intense when developing object oriented operating systems which have microkernel architectures. Such operating systems are typically extensible and distributed. That is, such operating systems permit clients to implement complex sub-systems at the client level, such as file systems, for example, without changes to the micro-kernel, and allow partitioning of data and computation across multiple computers. Examples of such new operating systems are the MACH system developed by Carnegie Mellon University, the QuickSilver system developed by the IBM Almaden Research Center and the SPRING operating system being developed by Sun Microsystems, Inc. (the assignee of this invention) which is more fully described below. Such extensible and distributed systems add to the already complicated set of failure modes,

METHOD AND APPARATUS FOR MANAGING TRANSACTIONS IN AN OBJECT-ORIENTED DISTRIBUTED SYSTEM

This is a continuation of application Ser. No. 08/023,027, filed Feb. 2, 1993 now abandoned.

BACKGROUND OF THE INVENTION

1. Field of the Invention

The present invention relates to the fields of distributed computing systems, client-server computing and object oriented programming. Specifically, the present invention is a method and apparatus for providing program mechanisms which are independent of the operating system kernel, to manage a transaction protocol in inter-client communications involving objects.

2. Background

Prior art methods for dealing with computer data processing system failures and system recovery upon the detection of a failure, have been based upon the notion of a well defined transaction, and a transaction management system. A transaction is defined as the execution of one or more programs that include data and transaction operations. Transaction operations are start, commit and abort. Start is an operation issued by a client to tell the system that a new transaction is about to begin. Commit is an operation issued by a transaction manager to tell the system that the transaction has terminated normally and all of its effects should be made permanent. Abort is an operation issued by a program or object manager or another transaction manager to indicate that the transaction terminated abnormally and all of its effects should be obliterated. Relatively formal systems for dealing with transactions for both concurrency control and recovery operations are well known and have been described in the art since the early 1960's. See for example, the text "Concurrency Control and Recovery in Database Systems" by P. A. Bernstein, V. Hadzilacos and N. Goodman, 1987 Addison-Wesley Publishing Company.

As computer data processing systems have become more widely distributed, such systems result in a significantly more complicated set of failure modes, and the resulting need to deal with these failures. However, reliable operation of distributed systems has generated more and more system constraints on the application programmer to conform to transaction and recovery processing ground rules imposed by the operating system.

A key problem in Operating Systems development and maintenance is permitting the introduction of new interfaces and implementation techniques in a way which allows clients and programmers maximum flexibility without loading the operating system down with implementation details. Moreover, this problem becomes more intense when developing object oriented operating systems which have microkernel architectures. Such operating systems are typically extensible and distributed. That is, such operating systems permit clients to implement complex sub-systems at the client level, such as file systems, for example, without changes to the micro-kernel, and allow partitioning of data and computation across multiple computers. Examples of such new operating systems are the MACH system developed by Carnegie Mellon University, the QuickSilver system developed by the IBM Almaden Research Center and the SPRING operating system being developed by Sun Microsystems, Inc. (the assignee of this invention) which is more fully described below. Such extensible and distributed systems add to the already complicated set of failure modes, and the resulting need to deal with these failures while permitting most system components to continue to operate. Dealing with such failures is generally called "Recovery Management".

Recovery, in general, is the process of restoring normal operation after the occurrence of a failure. Recovery management is the overall process of managing "recovery data", "recovery logs" and the process of restoring normal operations when necessary. Recovery data is data saved during execution of a transaction to enable error recovery. The data typically includes "recovery points", and information allowing all data to be restored to the values that existed prior to the recovery point. Thus for data changed since the last recovery point, the value of that data prior to the change must be saved as recovery data at the time the change is being made. This recovery data is saved until some activity tells the system that a new recovery point has been reached. As will be described below, this activity is performed by the Transaction Manager (TM) after determining that a transaction has been completed properly. A "Recovery Log" is a file created to permit recovery. The log contains information about all changes made to files or data bases or generally to the state of a process or object, since this state was last established as being correct. The performance of these transaction management and recovery management operations in an object oriented system require new approaches to these operations.

Referring now to FIG. 1, a typical prior art transaction management/recovery system is illustrated. Client/application programs 10 issue operations commands which go to a transaction manager 12. The transaction manager 12 coordinates activities with a scheduler program 14, which coordinates activities with either a Recovery Manager 16, or various operations programs 20, both of which may interface with either files or data bases 18.

In an object oriented system, an object is a component comprising data and operations which can be invoked to manipulate the data. The operations are invoked on the object by sending calls to the object. Each object has an object type. The object type defines the operations that can be performed on objects of that type. The object operations are implemented independent of the objects themselves. Additionally, one object type may inherit the object operations defined and implemented for other object types. For further description of object oriented design and programming techniques see "Object-oriented Software Construction" by Bertrand Meyer, Prentice-Hall 1988.

In client-server computing, typically there is a set of computers that can communicate with one another through a network connecting the computers. Some of these computers act as providers of services or functionality to other computers. The providers of such service or functionality are known as "servers", and the consumers of such service or functionality are called "clients". The client-server model also generalizes to the case where distinct programs running on the same computer are communicating with one another through some protected mechanism and are acting as providers and consumers of functionality.

In object oriented distributed systems based upon the client-server model, there exist servers that provide object oriented interfaces to their clients. These servers, sometimes called object managers in an object oriented system, support objects consisting of data and the associated software. Clients may obtain access to these objects and may execute calls on them. These calls are transmitted to the server from the client. At the server these calls are executed via the software associated with the object. The results of these calls are then transmitted back to the client.

In systems structured according to the client-server model, user-level processes maintain a substantial amount of client process state, such as open files, screen windows, and address space belonging to a process. Failure resilience in these environments requires that clients and servers be aware of problems involving each other. Such problems and processes to accommodate them are well documented in the prior art, as for example in the paper titled "Recovery Management in Quicksilver", by Roger Haskin, Yoni Malachi, Wayne Sawdon and Gregory Chan of the IBM Almaden Research Center, published in ACM Transactions on Computer Systems, Vol. 6, No. 1, Feb. 1988, pages 82–108.

Quicksilver uses transaction-based recovery as a single, system-wide recovery paradigm based upon the database notion of atomic transactions. An atomic operation is one that cannot be divided. Thus an atomic transaction is one wherein it is considered to have completed successfully only if all parts of the transaction completed successfully. That is, a transaction may comprise many different operations involving many different objects on many different computers and if any of these operations fails to complete properly, the transaction fails. When a transaction fails, all recorded state changes incident to the various operations must be reversed and the transaction started again from the beginning. In Quicksilver, transaction support occurs and is primarily controlled in the Interprocess Communication (IPC) section of the kernel. In systems such as this, the kernel is required to insure through enforcement that requests are issued on behalf of valid transactions by valid owners and/or participants, and to keep track of server participation. The IPC is required to contact the TM when a particular server is first invoked. Moreover, a check for the validity of the transaction id is made by the IPC on each invocation. Thus applications programmers developing clients or servers which run on kernel based systems like Quicksilver are forced to conform to the rules mandated by this kernel structure. In addition, existing client or server routines are not guaranteed to run on such systems unless they conform to the kernel's IPC rules and any change in the kernel's IPC procedure could result in changes in all associated client programs.

In an object oriented, distributed system, the micro-kernel is less constrained if operations like transaction management can by performed outside the base system. Accordingly, the present invention provides an object-oriented transaction management process that contains no transaction support in the base system IPC. In the present invention, no policy or code for transaction management is placed in the kernel. This is done by encapsulating the identity of a given transaction in the state of each object that is part of the transaction. This state is part of the object and is stored in the object manager of the object—the kernel has no knowledge of (and no business with) the transaction. This will permit various transaction methods to be used or changed without having to modify the base system. For example, the present invention will allow two or more separate subsystems running on the system, each with their own transaction management system (TM etc.). In the present invention, the way transaction ids are assigned can be changed, or the implementation of the IPC can be changed, without affecting other parts of the system. Additionally, no per-call check is necessary in the present invention. Since object handles are secure, when a call comes into a given object manager on some object, the state of the object encapsulates the transaction id and no check is needed for its validity.

SUMMARY OF THE INVENTION

The present invention provides an apparatus and a method comprising a logic module, called an object-oriented transaction manager (TM), that has been designed to provide control of the basic mechanisms of transaction assignment, transaction control, and commit and abort voting in object-oriented distributed systems, in a way which makes it easy for object implementors to select and use their own or an existing recovery facility, and which permits the application programmers to be unaware of the specific transactions that are being used for particular objects. Moreover, the present invention permits clients to use objects whose interfaces say nothing about transactions, as a part of a transaction that was initiated by the object's holder.

The present invention provides a transaction management process that requires no transaction support from the base system IPC. In the present invention, no policy or code for transaction management needs to be placed in the kernel. This is done by encapsulating the identity of a given transaction in the state of each object that is part of the transaction. This state is part of the object and is stored in the object manager of the object. The kernel needs have no knowledge of (and no business with) the transaction.

Specifically, the TM assigns a transaction identification (TID) value upon the request by a client program to start a transaction. This TID value is encapsulated in a TID object which is returned to the client. The client may then join any number of atomic objects to the transaction by passing them a copy of the TID object. The object manager of each joined object then notifies the TM of its identity and that it is participating in the transaction by giving the TM a call-back object. A two way transmission link is thereby established between the TM and all participants, identified by the TID value, whereby no support of the kernel is required to control the transaction.

In the most general case, the present invention functions in a general distributed computing system in the same manner. Specifically, the TM assigns a transaction identification (TID) value upon the request by a client program to start a transaction. This TID value is returned to the client program. The client program may then join any number of sub-programs to the transaction by passing them a copy of the TID value. The implementor of each joined sub-program then notifies the TM of its identity and that it is participating in the transaction by giving the TM a call-back mechanism. A two way transmission link is thereby established between the TM and all participants, identified by the TID value, whereby no support of the kernel is required to control the transaction, to monitor correct completion of the transaction by all participants, or to allow any participant to abort the transaction, without need for any support from the operating system kernel.

DESCRIPTION OF THE DRAWINGS

The objects, features and advantages of the system of the present invention will be apparent from the following description in which.

NOTATIONS AND NOMENCLATURE

Figure 1:
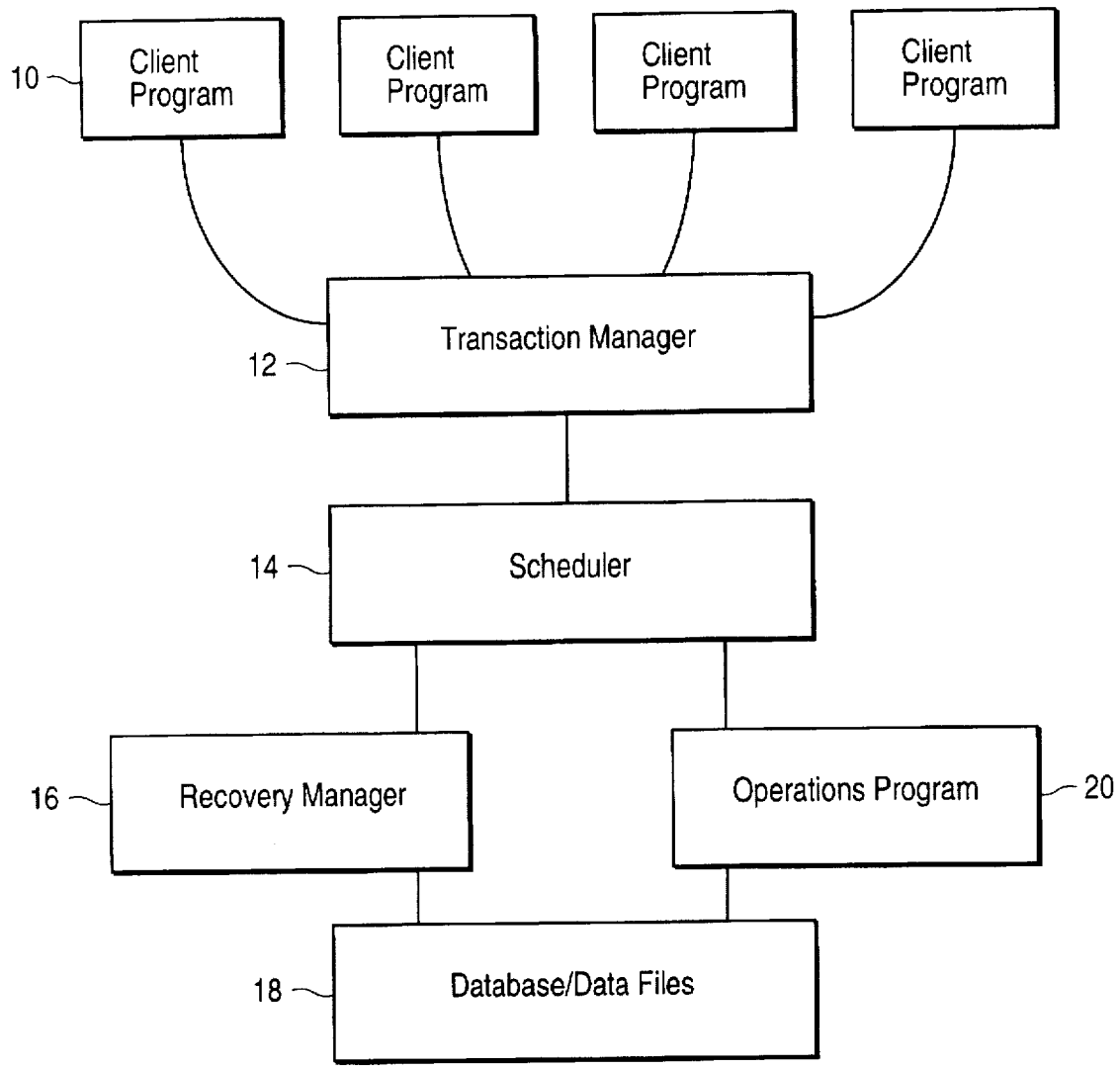
FIG. 1 illustrates a prior art transaction manager environment.

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or similar devices.

The present invention also relates to apparatus for performing these operations. This apparatus may be specially constructed for the required purposes or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

In the following description, for purposes of explanation, specific data and configurations are set forth in order to provide a thorough understanding of the present invention. The preferred embodiment described herein is implemented as a portion of the SPRING Object-Oriented Operating System created by Sun Microsystems®, Inc. (Sun Microsystems is a registered trademark of Sun Microsystems, Inc.) However, it will be apparent to one skilled in the art that the present invention may be practiced without the specific details and may be implemented in various computer systems and in various configurations, or makes or models of tightly-coupled processors or in various configurations of loosely-coupled multiprocessor systems. Moreover, it will be clear to those skilled in these arts that the present invention may be implemented in a non-object oriented distributed computing system.

A SPRING object is an abstraction that contains state and provides a set of methods to manipulate that state. The description of the object and its methods is an interface that is specified in the interface definition language. The interface is a strongly-typed contract between the implementor (server or object manager) and the client of the object.

A SPRING domain is an address space with a collection of threads. A given domain may act as the server of some objects and the clients of other objects. The implementor or object manager and the client can be in the same domain or in a different domain.

Since SPRING is object-oriented it supports the notion of interface inheritance. SPRING supports both notions of single and multiple interface inheritance. An interface that accepts an object of type "foo" will also accept an instance of a subclass of "foo". For example, the address_space object has a method that takes a memory_object and maps it in the address space. The same method will also accept file and frame_buffer objects as long as they inherit from the memory_object interface.

The SPRING kernel supports basic cross domain invocations and threads, low-level machine-dependent handling, as well as basic virtual memory support for memory mapping and physical memory management A SPRING kernel does not know about other SPRING kernels—all remote invocations are handled by a network proxy server. In addition, the virtual memory system depends on external pagers to handle storage and network coherency.

SPRING is an experimental distributed environment. It currently includes a distributed operating system and a support framework for distributed applications. SPRING is intended to explore solutions to a number of the problems of existing operating systems, particularly the problems of evolving and extending the system over time.

SPRING is focused on providing interfaces rather than simply on providing implementations. SPRING encourages the coexistence of radically different implementations of a given interface within a single system. It has proven convenient to use the object metaphor to express this separation of interfaces and implementations.

It is for these reasons that the present invention is designed to function without the need for support from the operating system kernel.

The spring object model

SPRING has a slightly different way of viewing objects from other distributed object oriented systems and it is necessary to clarify this before discussing the details of the present invention.

Figure 2A:
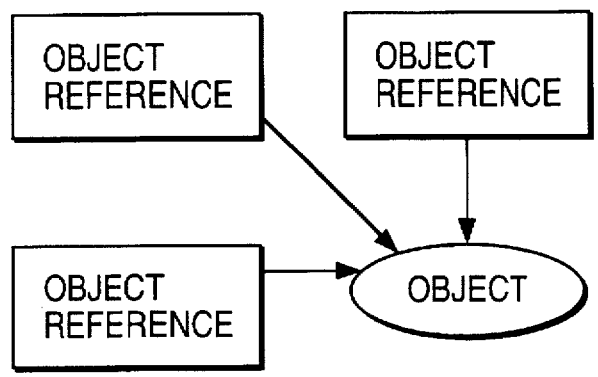
FIG 2a illustrates the prior art relationship of object reference to object; and 2b illustrates the SPRING environment relationship of objects to Object Manager.

Most distributed systems present a model wherein objects reside at server machines and client machines possess object handles that point to the object at the server. (See FIG. 2a.) So clients pass around object handles rather than objects.

Figure 2B:
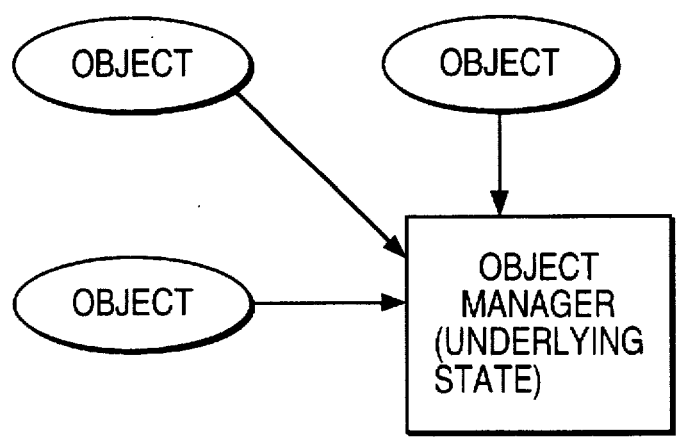

SPRING presents a model wherein clients are operating directly on objects, not on object handles. (See FIG. 2b.) Some of these objects happen to keep all their interesting state at some remote site, so that their local state merely consists of a handle to this remote state. An object can only exist in one place at a time, so if we transmit an object to someone else then we cease to have the object ourselves. However, we can also copy the object before transmitting it, which might be implemented such that there are now two distinct objects pointing to the same remote state.

So whereas in systems such as MACH, one might talk of several clients having object handles that reference some remote object, in SPRING one would talk about several clients having objects that reference the same remote state.

For most server-based objects this distinction is mainly one of terminology. However SPRING also supports objects which are not server based, or where the state of the object is split between the client and the server. In these cases it is much more convenient to regard the client as possessing the true object, rather than merely possessing a pointer or handle.

For all of these reasons, it can be seen that a transaction which involves objects may touch many objects and their managers and therefore a process must be constructed to allow the detection of failures at any point in a transaction so that the state of each entity involved in the transaction can be maintained correctly regardless of the failures which may occur. And similarly, this failure detection process must have the ability to detect successful completion of a transaction under these same complicated conditions.

At the present time, the SPRING operating system is based around a minimal kernel, which provides basic object-oriented interprocess communication and memory management. Functionality such as naming, paging, file systems, etc. are all provided as user-mode services on top of the basic kernel. The system is inherently distributed and a number of caching techniques are used to boost network performance for key functions. The system also supports enough UNIX® emulation to support standard utilities such as make, vi, csh, the X window system, etc. Thus SPRING must be able to support existing recovery semantics in these programs. (UNIX is a registered trademark of UNIX Systems Laboratories, Inc.)

SPRING's goal is to support a great deal of diversity. It is regarded as important that individual subsystems can develop their own ways of doing business, which can bypass the general rules and conventions. Thus, Object Managers in SPRING may devise their own recovery semantics and may include whatever use of logging techniques and corresponding recovery operations that they deem necessary. Accordingly, it is necessary to provide transaction management independently of the kernel in order to insure that modifications and enhancements may be made to the TM itself with no impact on the kernel or the using clients.

Transaction Management in SPRING

Figure 3:
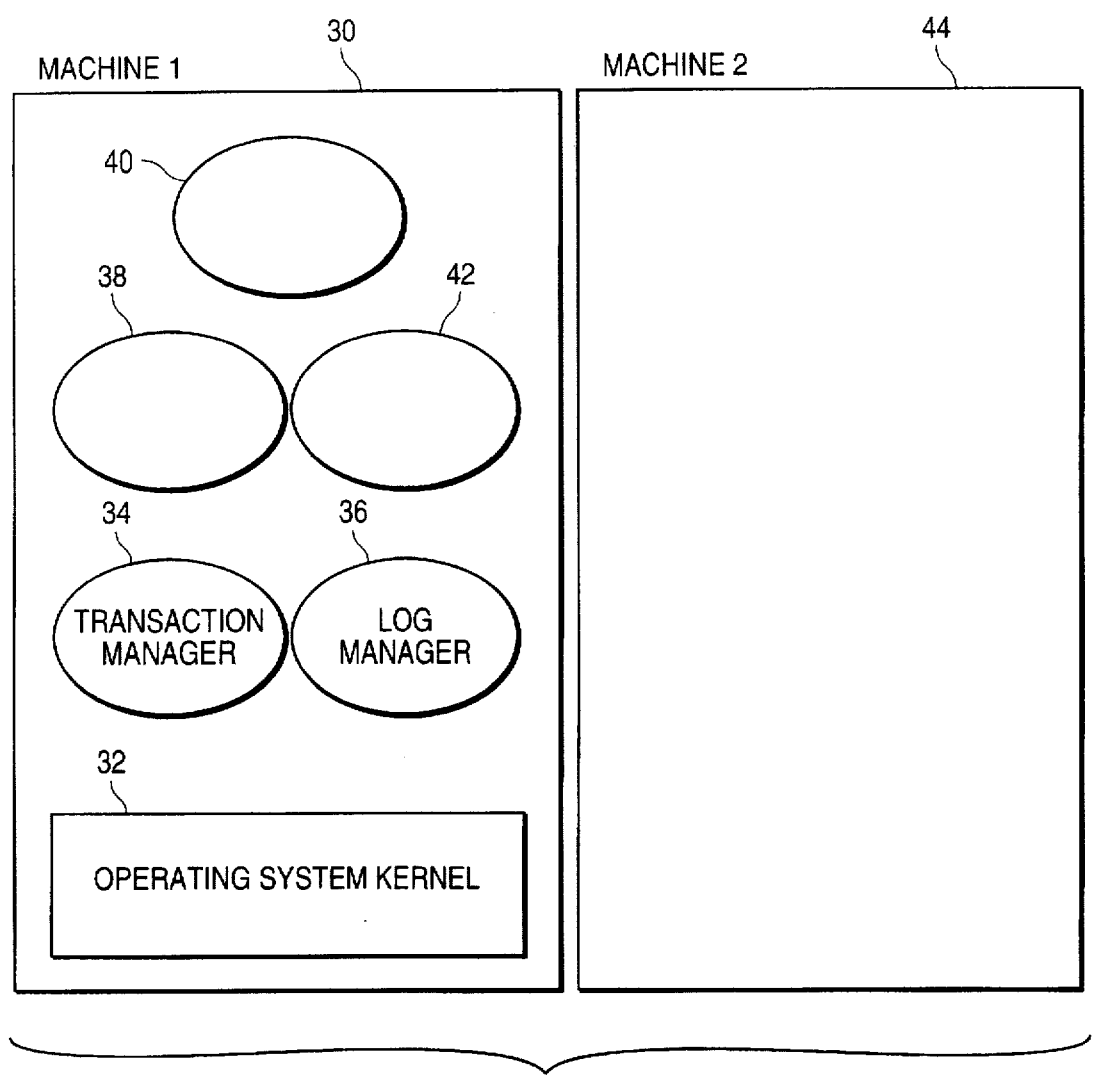
FIG. 3 illustrates a SPRING environment.

Referring now to FIG. 3, each machine or computer node 30, 44, has an operating system kernel 32, a Transaction Manager (TM) 34, a Log Manager 36, at least one Object Manager 38 and at least one client 40, 42. Each machine may also contain any number of other components such as file servers, name servers, domain managers, etc. As will be explained in more detail, the TM 34 creates transactions, keeps track of all object managers that are a part of each transaction, and coordinates transaction termination. The Log Manager 36 provides a general log facility for use by the TM 34 and object managers.

Object managers export objects that have transaction semantics. The exact semantics may be specified by each object manager. Such objects inherit from the "Atomic" interface. The Atomic interface provides a method "join_transaction" and a method to get the transaction identification number, "get_transaction$_{13}$ id" (See Appendix A). In the present invention this Atomic interface is used as follows: objects of say type "foo" that are willing to be a part of a transaction inherit from type "atomic". A protocol is defined which allows such objects to join a transaction. Once part of a transaction, these objects can be passed on to clients that expect objects of type "foo" but do not know anything about "atomic" objects or that these objects are participating in a transaction.

Figure 4:
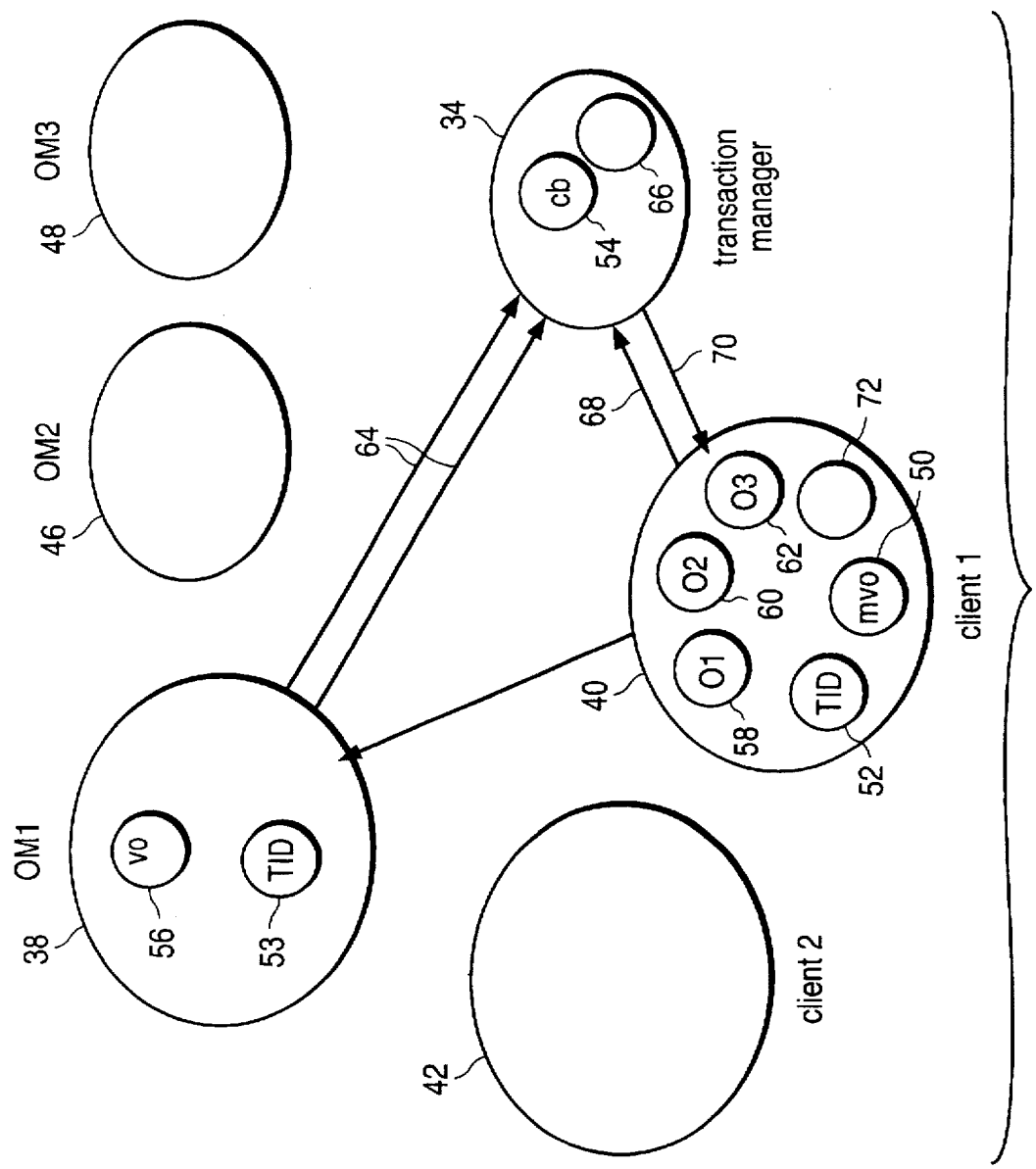
FIG. 4 illustrates transaction manager environment in the present invention.

Referring now to FIG. 4, a distributed system is depicted showing Client 1 40 and Client 2 42; TM 34; and three object managers OM1 38, OM2 46 and OM3 48. Client 1 40 is shown containing six objects as follows: a master voting object 50, a TID object 52, object 1 58, object 2 60, object 3 62 and a means for requesting objects to join a transaction 72. Object manager OM1 38 is shown containing a TID object 53 and a voting object 56. The TM 34 is shown containing a call back object CB-OM1 54, and a means for assigning TID values 66. Note that the Clients 40,42 and the TM 34 may also be objects.

Figure 5:
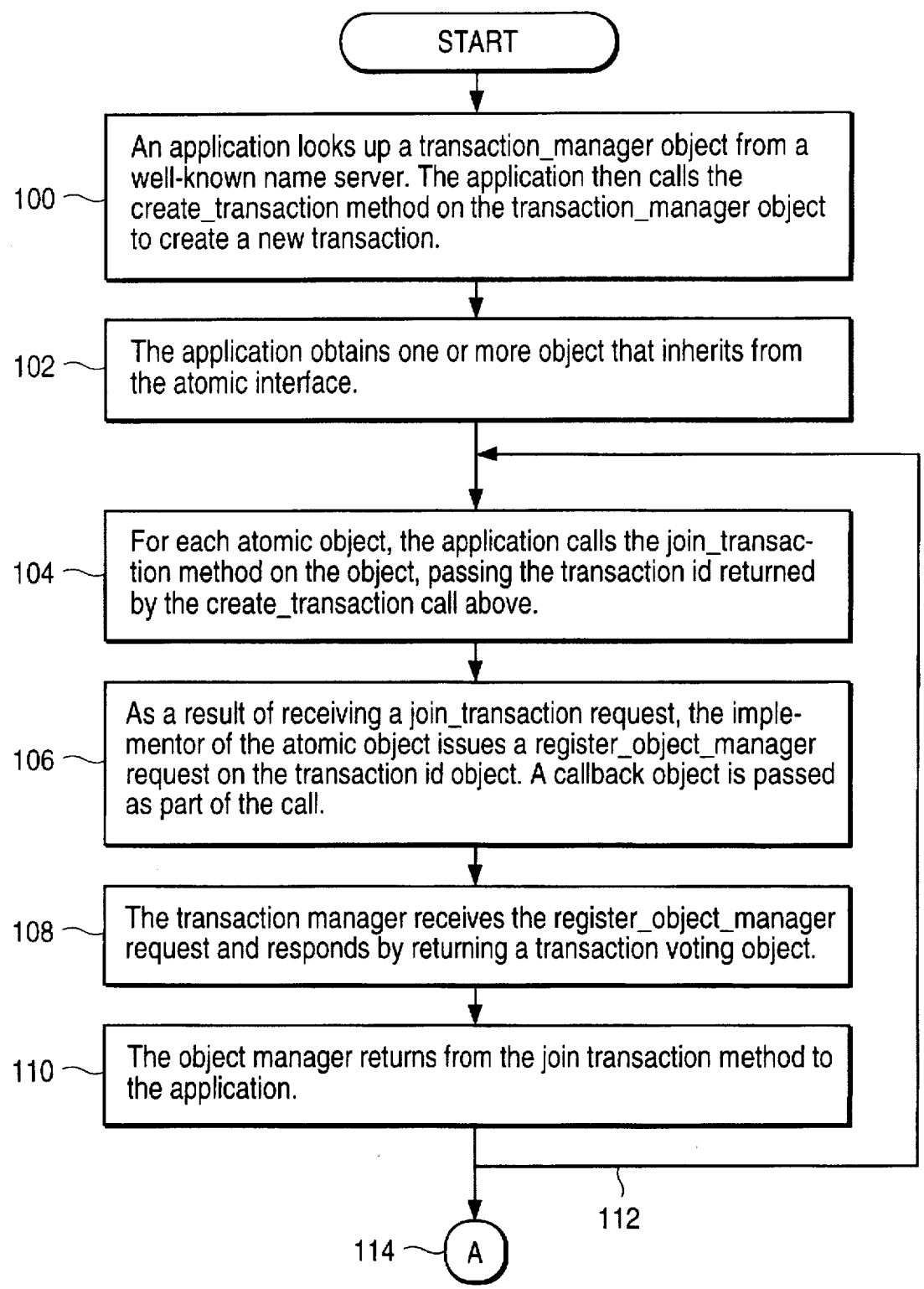
FIGS. 5, 6 and 7 contain a flow chart of the process of the present invention.
Figure 6:
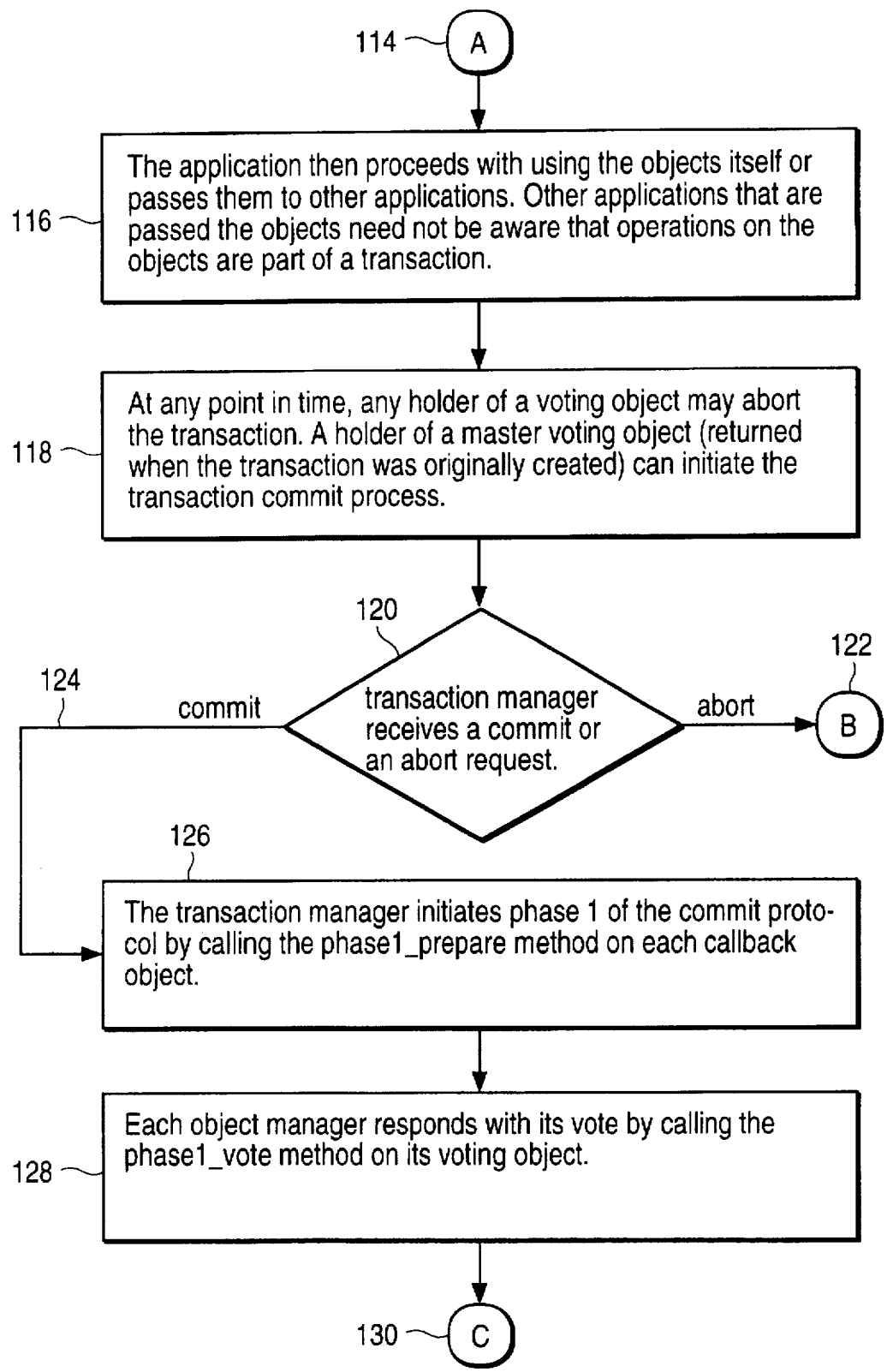
Figure 7:
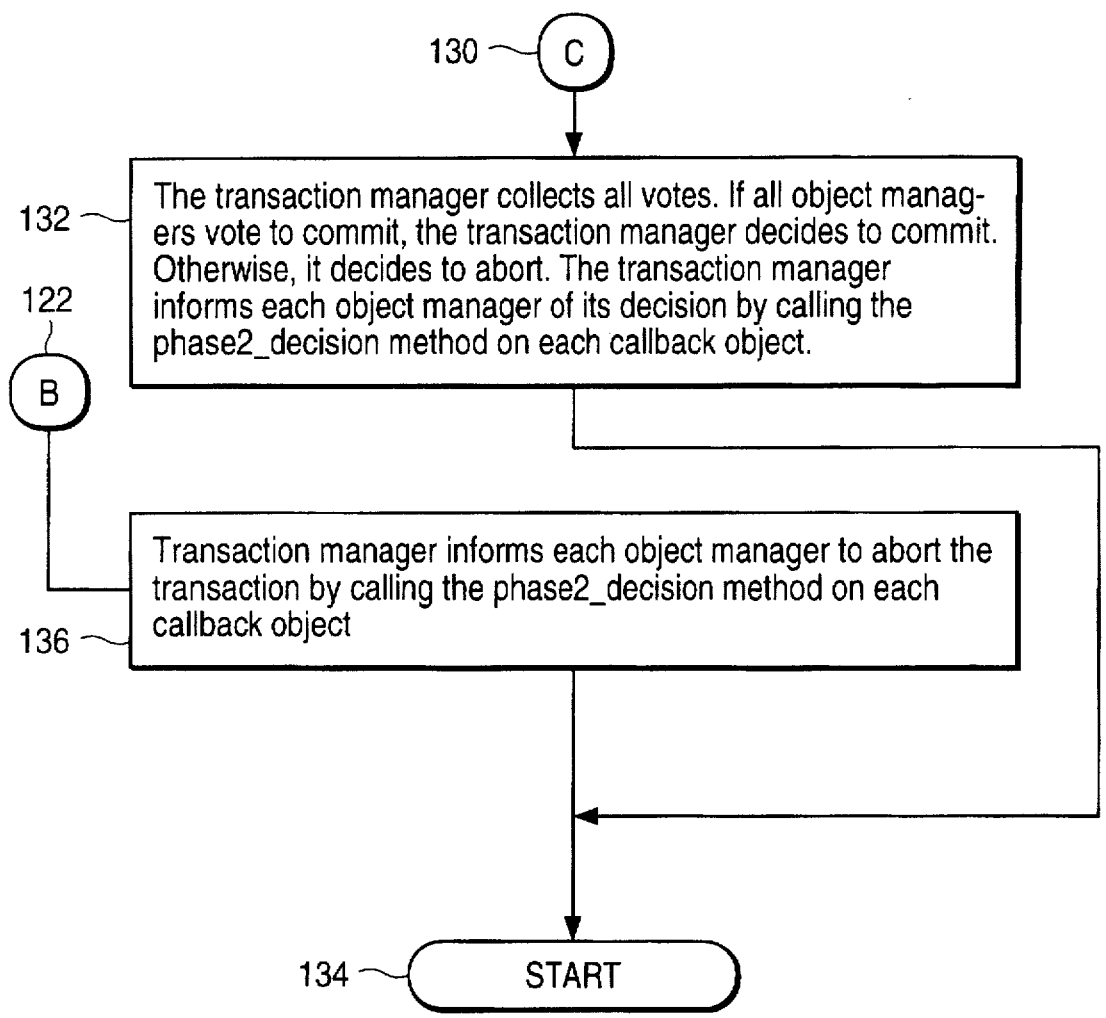

In the preferred embodiment of the present invention, a transaction is set up as follows, referring again to FIG. 4 and to the flow chart in FIGS. 5–7: Client 1 40 issues a command create_transaction () on the local TM 34. TM 34 assigns a TID value using the assignment means 66 and returns a transaction id object (TID) 52 and a master voting object 50 to the client 40 via a communications means 70, which may include a call-back object. (step 100 in FIG. 5) Object 1 58 is an object that inherits from type atomic and therefore has a join_transaction () method.(step 102) Client 1 40 uses the means for requesting objects to join a transaction 72 by invoking the join_transaction on method on object 1 58, passing it a copy of the TID object 53 which gets retained by OM1 38, the manager of object 1 58.(step 104) OM 1 38 in turn invokes the register_object_manager () command on the TID object 53 passing in a callback object CB-OM1 54. (step 106) The object manager of the TID object 53 is the TM 34 so TM retains the callback object CB-OM1 54, and responds by returning a transaction voting object 56 to the calling OM1 38 (step 108), thereby establishing a two-way communications channel 64 with OM1 38. Client 1 40 can repeat these steps of joining other atomic objects, such as Object 2 60 and Object 3 62 to the transaction.(step 112 and repeating steps 104 through 110 for each joined object). When any operations are now invoked on any of these joined objects 58, 60 or 62, the respective Object Manager OM1 38, OM2 46 or OM3 48 would know the transaction number under which the transaction is executing (because it holds the TID object). Each Object Manager is free to implement its own transaction semantics, use its own log services, synchronization facilities, etc. Other Object Managers may join the transaction at any time before the transaction is committed or aborted. An Object Manager may abort the transaction by calling TID.abort (). (step 118 in FIG. 6) This would result in the TM 34 sending transaction abort messages to all Object Managers for which the TM 34 held callback objects 54 for that transaction. (steps 122/FIG. 6 and 136/FIG. 7) The TM 34 would subsequently report to the originating client 40 that the transaction was aborted. (step 134). The Client could then retry the transaction or do whatever actions it wishes on receipt of the abnormal transaction completion indication. Any holder of a master voting object, such as Client 1 40 in FIG. 4, may initiate the commit protocol by calling the commit ( ) method on the master voting object 50.(steps 118, 120, 124 in FIG. 6). When the commit ( ) method is invoked on the master voting object 50, the TM 34, (which is the Object Manager of the master voting object) starts a 2-phase commit protocol, by issuing calls on the callback objects 54 that it holds for the indicated transaction. (steps 126 &128 in FIG. 6 and step 132 in FIG. 7). The TM collects all votes and if all participating object managers vote to commit, the TM will initiate the commit. Otherwise the TM will initiate an abort. The TM informs all participating object managers of its decision by invoking the phase2_decision method on each call-back object for the indicated transaction (step 132), and returns to the originating client program either an abort or commit indication (step 134).

In the present invention, the exact commit protocol (2 phase etc) is changeable. In the invention, a two-way communication channel is established between each OM and TM; any commit protocol can then be implemented. In the preferred embodiment described above, a basic well-known unoptimized 2-phase commit protocol is used. Those skilled in the art will recognize that other optimizations described in the literature can be implemented in the present invention.

In the preferred embodiment, object managers (OMs) are responsible for implementing the transaction semantics for their "atomic" objects. They may, for example, serialize accesses to the object state and make sure that changes are undoable until commit time. In particular, an OM may need to use objects implemented by other OM's and therefore may want to ensure that operations on those remote objects are also part of the transaction. One way for the OM to ensure that everything the OM does is part of the transaction is to make sure that the object it is invoking is also "atomic". The OM invokes the join transaction method on each remote object it uses, passing the TID object of the transaction. In this manner, the TM is informed of all the participants in the transaction and can eventually contact all OMs at commit/ abort time. Those skilled in these arts will recognize that the implementation of the object managers may be done in many ways. Each OM that exports objects of type atomic has to worry about serializability, locking, logging data, recovery, etc. These are well-known problems and the particular way chosen to handle these issues are not essential to the present invention.

An OM may implement more than one object that is part of the same transaction. The OM may need to know if two of its objects are part of the same transaction (for serialization and locking, and for logging the state, etc.). Therefore, it will need to know whether two TID objects are "equivalent" or not. The transaction number obtained by querying the TID object can be used to determine if two objects are part of the same transaction. In an alternative embodiment, an object equivalency protocol can be defined on TID objects to determine whether two different TID objects are the same.

The present invention supports nested transactions. Starting and committing nested transactions are done in a similar manner to top-level transactions, except that a nested transaction TID object is obtained from some voting object rather than from a transaction_manager. That is, a top-level TID object is obtained from a transaction_manager.create_ transaction( ) call, while a nested transaction TID object is obtained from the voting object of a (top or nested) transaction.

In the preferred embodiment, nested transactions are handled as subtransactions. A subtransaction executes under some top-level transaction or under some other subtransaction. The idea of a subtransaction is that it can fail without failing its parent (sub)transaction, and when it commits, all of its changes are conditional on its parent committing.

In the present invention, the way a subtransaction is created is by calling the "create_subtransaction" method on a transaction voting object. The call looks very similar to the "create_transaction" call on the transaction manager object for a good reason: a subtransaction is very similar to a transaction in the way it is used. The difference is the following: whereas the create_transaction call creates a top-level transaction (that does not have a parent transaction), the create_subtransaction call creates a subtransaction whose parent is the (sub)transaction represented by the transaction voting object on which the create_ subtransaction call is made.

Figure 8:
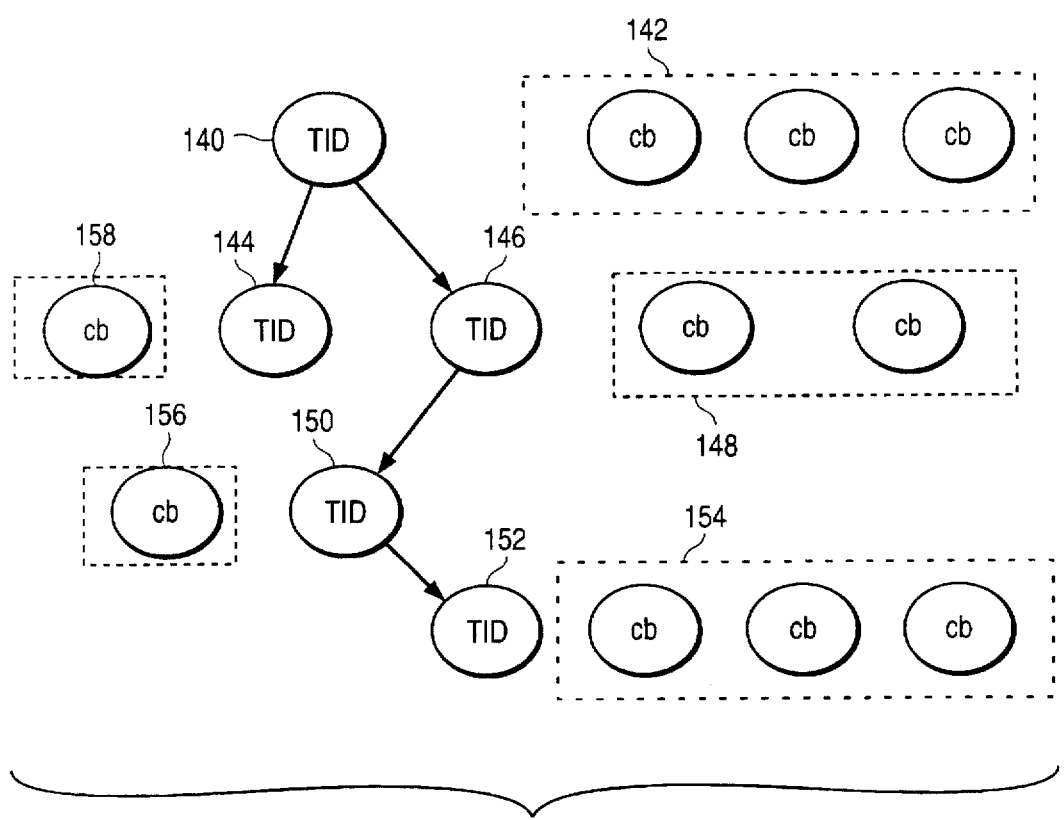
FIG. 8 illustrates a tree of nested transactions.

Referring to FIG. 8, a tree of nested subtransactions rooted at a top-level transaction is depicted. A top-level TID 140 is shown with its related callback objects 142. The top-level TID 140 is connected to subtransaction TIDs 144 and 146, each of which has a related set of one or more callback objects 158 and 148. Similarly, one subtransaction TID 146 is connected to a sub-subtransaction TID 150 which itself is connected to a subtransaction TID 152, and each of these having related callback objects 156 and 154. The TM has complete knowledge of the transaction tree.

The tree depicted in FIG. 8 is effectively created by the TM internally. Since the parent transaction is represented by the transaction voting object on which the create_ subtransaction call is made, the create_subtransaction call creates a "child" subtransaction. Therefore, the TM knows the parent-child relationship of each (sub)transaction-subtransaction and can therefore build the tree.

Once created, the operations on the objects returned from the create_subtransaction call (the callback_object, TID object, and master_voting_object) are used in the SAME way as if the objects were obtained from a create_ transaction. The only differences are (1) when the subtransaction is committed the changes are not really committed until its parent is committed and (2) aborting the subtransaction does not abort its parent (sub)transaction. These two differences give subtransactions their properties as "firewalls" where operations may commit or abort without affecting their parent, until the parent commits itself.

In the preferred embodiment, the present invention allows creating nested transactions from within other nested transactions and also allows more than one nested transaction to be active simultaneously. Particular implementations may place their own restrictions on the creation of a nested transaction.

As described above, a Client, having joined some atomic objects in a transaction, can now pass these objects around to other Clients or objects who can use them without having any knowledge that the objects are part of a transaction. A naive program or command is defined as one which does not know anything about transactions.

Prior art systems such as Quicksilver, can handle naive programs in a restricted sense. What they can do is to execute ALL operations of a naive application as one transaction. In Quicksilver for example, each application has a default transaction that the system will use for naive applications. What such prior art systems CANNOT do is to selectively create one or more transactions and make one or more naive applications execute under these transactions, or selectively make some objects operated on by the naive application be part of a transaction and some not.

By encapsulating the transaction id in objects, and then giving these objects to naive applications, the present invention can control which objects are past of the transaction, and can make more than one naive application as part of the SAME transaction.

The following is an extended example. Assume that we have a shell program that interprets commands typed to it (or read from a file) and it executes these commands using transactions. The commands themselves are naive (they do not know anything about transactions). Instead, the commands are passed some objects when they start, or the commands may look them up while they are running.

For example, if the following command was typed to the shell ("l" is like UNIX pipes):

naive-program1 file1 file2 | naive-program2 file3 | naive-program3 file4 the shell can create ONE transaction, look-up the objects representing file1, file2, file3 and file4, make these objects join the SAME transaction, then start naive-program1, naive-program2, and naive-program3, passing them the files they expect. In this way, all three programs operate under the SAME transaction. After the command given above exits, the shell can commit the transaction.

Or if the shell wishes, it may execute any number of other commands under the SAME transaction before deciding to commit the whole set of changes. For example, the shell may have special scripting language to bracket its operations under transactions. A user may type e.g.:

% start-transaction
> naive-program1 file1 file2 | naive-program2 file3 | naive-program3 file4
> more naive program execution
> end-transaction
%

This is more powerful, since the shell can interpose on the name space of the naive applications, and for all name lookups done by the application, return an object that inherits from "atomic". So in the above example, before starting each application, the shell sets up the per-domain name space such that it can interpose on all name lookups, and for each object looked up, it can see if the object is of type atomic, and make the object join the transaction before returning the object to the naive application.

Note that in doing all of the above, there is no need to modify any of the naive applications, and no special help from the kernel nor the IPC mechanism is needed. Moreover, the grouping of which commands execute under which transactions can be dynamically determined by the shell as there is no set "default" transaction per application. This capability is strikingly different than the prior art systems, where either the application is aware of transactions, or has to execute under one top-level "default" transaction. There appears to be no way in the prior art, where a group of naive applications can execute under the same transaction.

Continuing the exemplary embodiment described above, the shell can use subtransactions if it chooses, e.g. a user may type the following to this shell:

% start-transaction
> some naive application(s) execute
> TRY some other naive application(s)
> IF failed, TRY some other naive application(s)
> end-transaction where each TRY command is interpreted by the shell as creating a subtransaction of the top transaction started by the shell command "start-transaction".

While the invention has been described in terms of a preferred embodiment in a specific operating system environment, those skilled in the art will recognize that the invention can be practiced, with modification, in other and different operating systems within the spirit and scope of the appended claims.

Page: 22

APPENDIX A

```
//
// Copyright (c) 1991 by Sun Microsystems, Inc.
//
// This file defines an "atomic" interface that can be inherited by other
// objects to provide a "join_transaction" method for the object.
//
//                              4/23/91  yak
//                              1/6/93   yak import transaction;

module atomic
{
   exception already_in_transaction { };

interface atomic
   {
      void join_transaction(copy transaction::id tid)
         raises (already_in_transaction);

transaction::id get_transaction_id();
   }; // atomic

}; // atomic
```

P427_2/19/93

Page: 23

APPENDIX B

```
//
// Copyright (c) 1991 by Sun Microsystems, Inc.
//
// This file defines the "transaction" module.
//
//                              4/23/91  yak
//                              1/6/93   yak import access;

module transaction
{
    interface callback_object;
    interface voting_object;
    interface master_voting_object;

enum outcome {
        commit,
        abort
    };  // outcome exception unknown_transaction { };
    exception unknown_vote { };
    exception aborted { };
    exception committed { };
    exception participant_already_voted { };

// The transaction id object represents a transaction.
    // It is obtained from the transaction_manager or from another
    // transaction id object and passed around to "atomic" objects when they
    // join a transaction.
    // each transaction id has an id_num that is unique with respect to
    // a given transaction_manager typedef sequence<unsigned long> id_num;

interface id
    {
        void register_object_manager(copy callback_object cb_object,
```

P427_2/19/93

Page: 24

```
produce voting_object new_voting_object)
                                            raises (access::denied);

// An id_num is associated with each transaction
    // id object and is unique with this respect to this transaction_manager.
    // It can be used as a hint by object managers if they want to test
    // for equality of transaction id objects.
    id_num get_transaction_id_num();

}; // id interface voting_object
{
    void create_subtransaction(
        copy callback_object cb_object,
        produce id tid,
        produce master_voting_object master
    )
        raises (access::denied);

void abort()
        raises (participant_already_voted, committed);

void phase1_vote(copy outcome vote)
        raises (unknown_vote, aborted,
        participant_already_voted, committed);

}; // voting_object interface master_voting_object : voting_object
{
    void commit();
}; // master_voting_object // The "callback_object" is passed to the transaction id object and used
// to create a two-way communication channel with the transaction manager.

interface callback_object
{
    // methods for 2-phase commit:
    void phase1_prepare();

void phase2_decision(copy outcome decision);
}; // callback_object
```

P427_2/19/93

Page: 25

```
// The "manager" is the interface used by clients who wish to
// create a transaction.

interface manager
{
    void create_transaction(
        copy callback_object cb_object,
        produce id tid,
        produce master_voting_object master
    )
    raises (access::denied);

outcome get_finished_transaction_status(copy long id)
        raises (unknown_transaction);

}; // manager

}; // transaction
```

P427_2/19/93

Page: 26

APPENDIX C

```
//
// Copyright (c) 1991 by Sun Microsystems, Inc.
//
// This file defines the "transaction_log" interface.
//
//                                    8/15/91  yak
//                                    1/6/93   yak import access;
import transaction_manager;

module transaction_log
{
    interface transaction_log;
    interface cursor;

exception no_such_sequence_number { };
    exception end_of_log { };
    exception access_trouble { };

// each entry into the log has a sequence_number. Sequence_numbers are
    // monotonically increasing but are not necessarily consecutive.
    typedef unsigned long sequence_number;

typedef sequence<char> log_data;
    typedef sequence<char> checkpoint_info;

// our clients obtain transaction_log objects from this interface.
    // retrieve_log() will returns an object representing an
    // existing transaction_log for a given principal_name or a new
    // one if this is the first time this principal_name asks for
    // a transaction_log.
    interface manager
    {
        transaction_log retrieve_log(copy auth::principal_name pn);
    }; // manager // transaction_log object is used to write and read log entries.
    // Each entry consists of a transaction::id_num and
    // a bag of bits. transaction_log associated a sequence_number with
```

P427_2/19/93

Page: 27

```
// each entry.
interface transaction_log
{
    // write a new log entry. The write is not forced out
    // unless force_log is set to true in which case the call
    // does not return until the write goes out to stable storage.
    // The call returns the sequence_number of the write.

sequence_number write(copy transaction::id_num trans_id_num,
            consume log_data data, copy boolean force_log)
                                        raises (access_trouble);

// force out onto stable storage all log entry numbered less than or
    // equal to the given sequence_number.
    void force_log(copy sequence_number upto_sequence_number)
        raises (access_trouble);

// return a previously written log entry. Exception
    // no_such_sequence_number is returned if no such entry
    // exists.
    void read_by_sequence_number(
            copy sequence_number sn,
            produce transaction::id_num trans_id_num,
            produce log_data data
        )
        raises (no_such_sequence_number, access_trouble);

// the following two methods return cursors into the log.
    // get_cursor() returns a cursor onto all entries entered by
    // this principals, while get_trans_id_cursor() returns a cursor onto
    // all entries indexed by the given transaction::id_num.
    cursor get_cursor();
    cursor get_trans_id_cursor(copy transaction::id_num trans_id_num);

// Each transaction_log has a checkpoint_info area that can
    // be used by the client to store any checkpoint_info it desires.
    // Writes to the checkpoint_info are forced.
    void write_checkpoint_info(copy sequence_number sn,
consume checkpoint_info data)
        raises (access_trouble);
```

P427_2/19/93

Page: 28

```
    void read_checkpoint_info(produce sequence_number sn,
produce checkpoint_info data)
        raises (access_trouble);

}; // transaction_log

// A cursor is an object that is used to read the log serially.
// By default the cursor is set_to_end, i.e. reading backward.
interface cursor
{
   void set_to_end();
   void set_to_start();
   void read_next(produce transaction::id_num trans_id_num,
                                         produce log_data data)
        raises (end_of_log, access_trouble);
};

}; // transaction_log
```

What is claimed is:

1. In a distributed computing system. having at least one client program and at least one sub-program, each sub-program having an implementor, said system having at least one computer node, and each node having an operating system kernel, a method for managing transactions, performed by a computer, comprising the steps of:

providing a Transaction Manager (TM) in each node, said TM comprising mechanisms configured to provide control of transaction assignment, transaction control, and commit and abort voting in object-oriented distributed systems;

assigning a transaction identification (TID) value to a request from an originating client program to create a transaction and returning said TID value to the originating client program;

the originating client program requesting at least one sub-program to join as a participant in the transaction and passing a copy of said TID value to said at least one participating sub-program;

the TM receiving a call-back mechanism from an implementor of said at least one participating sub-program, and returning a transaction voting mechanism to said implementor, thereby establishing a two-way communication path between the TM and the implementor of the at least one participating sub-program;

whereby all participating sub-programs may indicate whether said transaction was completed correctly, without any required support of the operating system kernel.

2. The method of claim 1 wherein said implementors may notify the TM to abort the transaction, without any required support of the operating system kernel.

3. The method of claim 2 wherein said participating sub-programs and said originating client program can be notified by the TM of the completion status of said transaction, without any required support of the operating system kernel.

4. The method of claim 3 wherein all programs, sub-programs and implementors are objects.

5. In an object-oriented distributed computing system, having at least one client program and at least one object, each object having an object implementation, said system having at least one computer node, and each node having an operating system kernel, a method for managing transactions, performed by a computer, comprising the steps of:

providing a Transaction Manager (TM) in each node, said TM comprising mechanisms configured to provide control of transaction assignment, transaction control, and commit and abort voting in object-oriented distributed systems;

assigning a transaction identification (TID) value to a request from an originating client program to create a transaction and returning a TID object containing said value to the originating client program;

the originating client program requesting at least one object to join as a participant in the transaction and passing a copy of said TID object to said at least one participating object;

the TM receiving a call-back object from an object implementation of said at least one participating object, and returning a transaction voting object to said object implementation, thereby establishing a two-way communication path between the TM and the object implementation of the at least one participating object;

whereby all participating objects may indicate whether said transaction was completed correctly, without any required support of the operating system kernel.

6. The method of claim 5 wherein said object implementations may notify the TM to abort the transaction, without any required support of the operating system kernel.

7. The method of claim 6 wherein said participating objects and said originating client program can be notified by the TM of the completion status of said transaction, without any required support of the operating system kernel.

8. The method of claim 5 comprising the additional step of said TM returning a master voting object containing the TID value to said originating client program, in response to the command to create a transaction, whereby said originating client program can query the TM as to the completion status of said transaction without support from said operating system kernel.

9. The method of claim 5 wherein the step of said TM receiving a call-back object from an object implementation of a participating object results from said object implementation of a participating object invoking the register__object__manager command on the TID object, said TM being the object implementation of the TID object.

10. The method of claim 9 wherein said at least one participating object may be on any of the computer nodes in the distributed computing system.

11. The method of claim 10 wherein an object implementation of an object participating in said transaction may be on any of the computer nodes in the distributed computing system.

12. The method of claim 11 wherein objects participating in said transaction inherit from an object of type atomic.

13. The method of claim 12 wherein said objects which inherit from said object of type atomic are invited to be participants in said transaction by said originating client program by invoking the join__transaction (TID) call on each of said object of type atomic.

14. The method of claim 13 wherein said participating objects which have been joined to said transaction may be passed around to other client programs that do not know that operations on these participating objects are part of a transaction.

15. In an object-oriented distributed computing system, having at least one client program and at least one object, each object having an object implementation, said system having at least one computer node, and each node having an operating system kernel, an apparatus for managing transactions comprising:

a Transaction Manager (TM) in each node, said TM comprising mechanisms configured to provide control of transaction assignment, transaction control, and commit and abort voting in object-oriented distributed systems;

said TM further comprising mechanisms configured to assign a transaction identification (TID) value to a request from an originating client program to create a transaction and a first communications mechanism configured to return a TID object containing said TID value to the originating client program;

a requesting mechanism configured to be used by the originating client program in requesting at least one object to join as a participant in the transaction wherein said request passes a copy of said TID object to said at least one participating object; and a second communications mechanism configured to be used by the TM for receiving a call-back object from an object implementation of said at least one participating object, and for returning a transaction voting object to said object implementation, thereby establishing a two-way communication path between the TM and the object implementation of the at least one participating object;

whereby all participating objects may indicate whether said transaction was completed correctly, without any required support of the operating system kernel.

16. The apparatus of claim 15 wherein said object implementations may notify the TM to abort the transaction, without any required support of the operating system kernel.

17. The apparatus of claim 16 wherein said participating objects and said originating client program can be notified by the TM of the completion status of said transaction, without any required support of the operating system kernel.

18. The apparatus of claim 15 wherein said TM returns a master voting object containing the TID to said originating client program in addition to said TID object, in response to the command to create a transaction, whereby said originating client program can query the TM as to the completion status of said transaction without support from said operating system kernel.

19. The apparatus of claim 18 wherein said TM receiving a call-back object from an object implementation of a participating object results from said object implementation of a participating object using said second communications means to register said object implementation with said TM.

20. The apparatus of claim 19 wherein said at least one participating object may be on any of the computer nodes in the distributed computing system.

21. The apparatus of claim 20 wherein an object implementation of an object participating in said transaction may be on any of the computer nodes in the distributed computing system.

22. The apparatus of claim 21 wherein objects participating in said transaction inherit from an object of type atomic.

23. The apparatus of claim 22 wherein said objects which inherit from said object of type atomic are invited to be participants in said transaction by said originating client program by invoking the join_transaction (TID) call on each of said objects.

24. The apparatus of claim 23 wherein said participating objects which have been joined to said transaction may be passed around to other client programs that do not know that operations on these participating objects are part of a transaction.

25. A computer program product having a computer readable medium having a computer program recorded thereon for managing the processing of transactions invoked by a client application, for use in an object oriented distributed computer system wherein there exists client applications, objects, object type definitions, object implementations and servers, and an operating system kernel, said computer program product comprising:
   a Transaction Manager (TM) comprising mechanisms configured to provide control of a transaction in object-oriented distributed systems;
   an assigning program code mechanism for use by a transaction manager (TM) to assign a transaction identification (TID) value to a request from an originating client program to create a transaction and a first communications means for returning a TID object containing said value to the originating client program;
   a requesting program code mechanism for use by the originating client program in requesting at least one object to join as a participant in the transaction wherein said request passes a copy of said TID object to said at least one participating object; and
   a second communications mechanism for use by the TM for receiving a call-back object from an object implementation of said at least one participating object, and for returning a transaction voting object to said object implementation, thereby establishing a two-way communication path between the TM and the object implementation of the at least one participating object; whereby all participating objects may indicate whether said transaction was completed correctly, without any required support of the operating system kernel.

26. The computer program product of claim 25 wherein said object implementations may notify the TM to abort the transaction, without any required support of the operating system kernel.

27. The computer program product of claim 26 wherein said participating objects and said originating client program can be notified by the TM of the completion status of said transaction without any required support from the operating system kernel.

28. The computer program product of claim 27 wherein the TM has the ability to return a master voting object containing the TID to said originating client program in addition to said TID object, in response to the command to create a transaction, whereby said originating client program can query the TM as to the completion status of said transaction without support from said operating system kernel.

29. The computer program product of claim 28 wherein said TM has the ability to receive said call-back object from an object implementation of a participating object when said object implementation of a participating object uses said second communications means to register said object implementation with said TM.

30. The computer program product of claim 29 wherein said at least one participating object may be on any computer node in said distributed computing system.

31. The computer program product of claim 30 wherein an object implementation of an object participating in said transaction may be on any computer node in said distributed computing system.

32. The computer program product of claim 31 wherein objects participating in said transaction inherit from an object of type atomic.

33. The computer program product of claim 32 wherein said objects which inherit from said object of type atomic are invited to be participants in said transaction by said originating client program by invoking the join_transaction (TID) call on each of said objects.

34. The computer program product of claim 33 wherein said participating objects which have been joined to said transaction may be passed around to other client programs that do not know that operations on these participating objects are part of a transaction.

35. A computer program product having a computer readable medium having a computer program recorded thereon for managing the processing of transactions invoked by a client application, for use in a distributed computer system wherein there exists client applications programs, sub-programs, implementors, and an operating system kernel, said computer program product comprising:
   a Transaction Manager (TM) comprising mechanisms configured to provide control of a transaction in object-oriented distributed systems;
   an assigning program code means for use by a transaction manager (TM) to assign a transaction identification (TID) value to a request from an originating client program to create a transaction and a first communications means for returning said TID value to the originating client program;
   a requesting program code means for use by the originating client program in requesting at least one sub-program to join as a participant in the transaction wherein said request passes a copy of said TID value to said at least one participating sub-program; and a second communications means for use by the TM for receiving a call-back mechanism from an implementor of said at least one participating sub-program, and for returning a transaction voting mechanism to said implementor, thereby establishing a two-way communication path between the TM and the implementor of the at least one participating sub-program;

whereby all participating sub-programs may indicate whether said transaction was completed correctly, without any required support of the operating system kernel.

36. The computer program product of claim 35 wherein said implementors may notify the TM to abort the transaction, without any required support of the operating system kernel.

37. The computer program product of claim 36 wherein said participating sub-programs and said originating client program can be notified by the TM of the completion status of said transaction without any required support of the operating system kernel.

38. The method of claim 3 comprising the additional step of said TM returning a master voting mechanism containing the TID value to said originating client program, in response to the command to create a transaction, whereby said originating client program can query the TM as to the completion status of said transaction without support from said operating system kernel.

39. The method of claim 38 comprising the additional step of invoking a create sub-transaction call on one of said transaction voting mechanisms whereby a nested transaction is created.

40. The method of claim 5 comprising the additional step of invoking a create sub-transaction call on one of said transaction voting objects whereby a nested transaction is created.

41. The apparatus of claim 15 further comprising invoking means for invoking a create sub-transaction call on one of said transaction voting objects whereby a nested transaction is created.

42. The computer program product of claim 25 further comprising a program code means for invoking a create sub-transaction call on one of said transaction voting objects whereby a nested transaction is created.

* * * * *